United States Patent

[11] 3,630,834

| [72] | Inventors | Bart J. Bremmer;<br>Fred J. Meyer, both of Midland, Mich. |
|---|---|---|
| [21] | Appl. No. | 33,924 |
| [22] | Filed | May 1, 1970 |
| [45] | Patented | Dec. 28, 1971 |
| [73] | Assignee | The Dow Chemical Company<br>Midland, Mich. |

[54] SIZING PAPER WITH ISOTHIOURONIUM SALTS OF POLYGLYCIDYL ETHERS OF POLYHYDRIC PHENOLS
10 Claims, No Drawings

[52] U.S. Cl. ................................................ 162/164, 162/168, 260/47 EN
[51] Int. Cl. ................................................ D21h 3/48
[50] Field of Search ................................ 162/164, 168; 260/47 EN

[56] References Cited
UNITED STATES PATENTS

| 2,713,569 | 7/1955 | Greenlee | 260/47 EN |
|---|---|---|---|
| 2,957,844 | 10/1960 | Wesp | 260/47 EN |

FOREIGN PATENTS

| 615,348 | 2/1961 | Canada | 162/164 |
|---|---|---|---|
| 1,260,785 | 8/1968 | Germany | 260/47 EN |

*Primary Examiner*—S. Leon Bashore
*Assistant Examiner*—Frederick Frei
*Attorneys*—Griswold & Burdick and D. B. Kellom ABSTRACT: A process for sizing paper by adding a water-soluble isothiouronium salt of a polyglycidyl ether of a polyhydric phenol to an acid or neutral slurry of cellulose pulp, adjusting the pulp pH to about 8–10 and then forming and drying the paper sheet. Preferably the salt is the thiourea derivative of a diglycidyl ether of a bisphenol.

SIZING PAPER WITH ISOTHIOURONIUM SALTS OF POLYGLYCIDYL ETHERS OF POLYHYDRIC PHENOLS

BACKGROUND

The synthesis of alkylene sulfides or thiiranes by reaction of thiourea and an alkylene halohydrin is described by Kienle U.S. Pat. No. 2,766,256. In this reaction an intermediate isothiouronium salt is formed which in the presence of base is converted to the thiirane, e.g.,

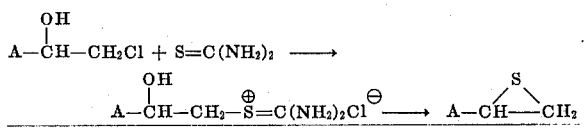

In MacKinney U.S. Pat. No. 2,962,457 the diglycidyl ether of bisphenol A is reacted with thiourea to yield the corresponding dithioglycidyl ether. The use of certain isothiouronium salts as cellulosic dyes is disclosed by Taber, Renfrew, and Pons U.S. Pat. No. 3,272,794. Also the advantages of water-soluble cationic products such as the cationic polyalkylenimine size of Lanes and Reynolds U.S. Pat. No. 2,698,793 is recognized.

STATEMENT OF THE INVENTION

It has been discovered that the water-soluble isothiouronium salts of polyglycidyl ethers of a polyhydric phenol are particularly effective sizing agents when added to an acid or neutral cellulose pulp and thereafter the pulp pH is adjusted to about 8–10 before forming the cellulosic sheet. Furthermore, the activity of these isothiouronium sizing agents is enhanced when a cationic retention aid, and particularly a polyalkylenimine is added after the pH adjustment.

GENERAL DESCRIPTION

The new sizing agents are water-soluble isothiouronium slats of polyglycidyl ethers of a polyhydric phenol. These salts are prepared by reaction of an appropriate glycidyl ether with thiourea in the presence of a strong inorganic acid, preferably hydrochloric or sulfuric acid:

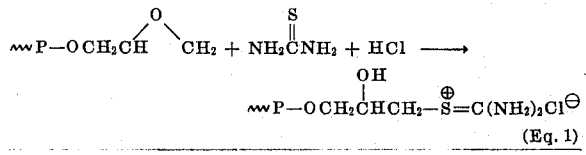

where P is a polyphenol group.

Particularly suitable glycidyl ethers are the bisphenol-epichlorohydrin resins (I) and low molecular weight novolac-epichlorohydrin resins (II) widely used in epoxy resin products:

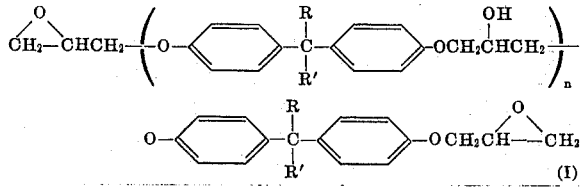

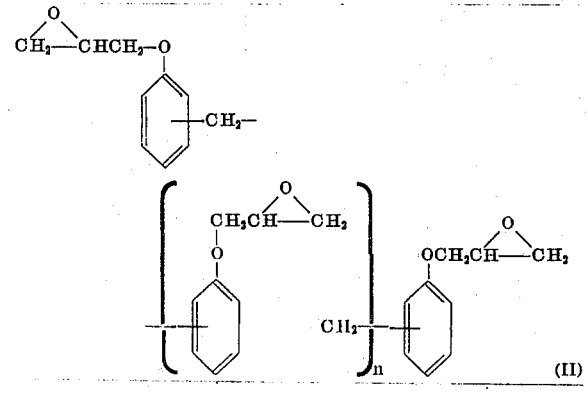

where

R is H or $C_1$–$C_2$ alkyl,
R' is H or $C_1$–$C_{18}$ alkyl, and
n is 0–3.

The commercial production of such epoxy resins is described in Lee & Neville "Handbook of Epoxy Resins," McGraw-Hill N.Y. (1967) Chapter 2. Typical are the diglycidyl ethers of 2,2'-bis(4-hydroxyphenyl)propane, bis(4-hydroxyphenyl) methane, and low molecular weight phenol-formladehyde novolac resins. Preferred are glycidyl ethers having an average of 2–3 epoxy groups and a molecular weight less than about 1,200.

As indicated by eq. 1 reaction of the glycidyl ether with thiourea and a strong acid yields the corresponding isothiouronium salt. Preferably, this reaction is carried out in aqueous solution at about 0–50° C. to give an aqueous solution containing 20–50 wt. percent of the salt, stable at room temperature at an acid or neutral pH. Such an aqueous solution is quite suitable for sizing cellulose products. But if desired, a solid isothiouronium salt can be recovered by standard techniques such as concentration and precipitation with methanol or other suitable water-soluble diluents.

In use as a sizing agent, an appropriate amount of the isothiouronium salt is added to the aqueous cellulose pulp slurry, preferably at the beater. The amount of additive required depends both on the specific pulp and the amount of sizing desired. But, in general, concentrations ranging from about 0.01–3.0 wt. percent based on dry pulp are most useful. Optimum sizing normally requires a loading of about 0.1–2.0 wt. percent.

Since the water-soluble isothiouronium salts are sorbed from aqueous solution by the cellulosic pulp fibers, they are preferably added as an aqueous solution to an acid or neutral pulp slurry at the beater, stock chest, or other point which permits adequate mixing prior to formation of the paper sheet. Alternately, a preformed paper can be treated by spraying or dipping using an aqueous solution of the isothiouronium salt.

After blending the pulp slurry and isothiouronium slat, the slurry pH is adjusted to about 8–10, and the cellulose sheet is formed and dried. Under these conditions, the isothiouronium salt interacts with the cellulose fibers, perhaps through formation of an intermediate thiirane, to provide the requisite sizing. Indeed, effective sizing is obtained by prereacting the isothiouronium salt with base to form the thiirane, normally a water-insoluble product, and applying the dithiirane to preformed paper as a solution in a chlorinated solvent.

A cationic retention aid is advantageously added to the treated cellulose pulp after the pH adjustment. Particularly effective as a retention aid are polyethylenimines such as described in Lanes and Reynolds U.S. Pat. No. 2,698,793 although other cationic retention aids including hydrolyzed polyacrylamide and cationic starch as described in Reynolds Sexsmith U.S. Pat. No. 3,212,962 can be used. Normally about 0.1–2.0 wt. percent retention aid based on dry pulp is used.

Other conventional additives including fillers and wet and dry strength additives can also be added at the appropriate stage.

After treating the cellulose pulp or paper with the water-soluble isothiouronium slats of the polyglycidyl ethers, and adjusting the pH to about 8–10, the paper is dried under normal conditions at about 50°–150° C., preferably about 100°–150° C., and the polyglycidyl ether converted into a water-insoluble size.

The following examples illustrate further this invention. Unless otherwise specified, all parts and percentages are by weight.

EXAMPLE 1

Isothiouronium Salts of Polyglycidyl Ethers of Polyhydric Phenols

A. The following general procedure was used to prepare the isothiouronium salts by reaction of commercial glycidyl ethers with thiourea in aqueous acetone.

A mixture of 19.0 parts (0.25 mole) thiourea, 100 parts water and about 50 parts acetone was cooled to 0° C., and 25.0 parts (0.25 mole) 36.5% HCl added. Then 0.225 mole of the polyglycidyl ether of a polyhydric phenol diluted with about 27 parts acetone was added slowly to the cold stirred thiourea solution in about 1.5–2.0 hr. To complete the reaction, the aqueous mixture was heated at 40°–45° C. for 1 hr. before stripping the acetone under reduced pressure to give an aqueous solution of the isothiouronium chloride containing about 20–50 percent solids.

Table 1 gives the chemical structure and formula for a number of typical polyphenol glycidyl ethers (GE).

TABLE 1.—TYPICAL GLYCIDYL ETHERS OF POLYPHENOLS

| GE No. | Glycidyl ether a | Formula |
|---|---|---|
| 1-1 | $CH_2\text{—}CHCH_2\text{—}O\text{—}\langle\rangle\text{—}C(CH_3)_2\text{—}\langle\rangle\text{—}OCH_2CH\text{—}CH_2$ (diepoxide) | I: $R=R'=CH_3, n=0$ |
| 1-2 | $CH_2\text{—}CHCH_2\text{—}O\text{—}\langle\rangle\text{—}C(CH_3)((CH_2)_{16}CH_3)\text{—}\langle\rangle\text{—}OCH_2CH\text{—}CH_2$ | I: $R=CH_3, R'=C_{17}H_{35}, n=0$ |
| 1-3 | D.E.R.® 330 Epoxy Resin | I: $R=R'=CH_3, n\sim 0.2$ |
| 1-4 | D.E.R.® 661 Epoxy Resin | I: $R=R'=CH_3, n\sim 2.0$ |
| 1-5 | D.E.N.® 431 Epoxy Novolac | II: $n\sim 0.2$ |
| 1-6 | D.E.N.® 438 Epoxy Novolac | II: $n\sim 1.6$ | a D.E.R.® and D.E.N.®—commercial epoxy resins from The Dow Chemical Co.

B. The solid isothiouronium salts can be recovered from the aqueous solutions by standard means as, for example, further concentration and then precipitation with methanol or another suitable water-soluble solvent. Thus, for a 20 percent aqueous solution of the bisisothiouronium chloride salt of GE 1–1 was obtained a stable solid salt, m.p. 157°C.

Anal:
Calc. C, 48.9; H, 6.1; N 9.9; Cl, 12.5; S, 11.3
Found C, 47.0; H, 6.4; N, 9.0; Cl, 13.9; S, 10.5.

C. Further identification of the isothiouronium salts was obtained by conversion to the corresponding thiiranes by treating an aqueous solution of an isothiouronium salt with a slight excess of aqueous sodium carbonate at 20°–30° C. Extraction with methylene chloride followed by drying and removal of the methylene chloride gave 85–95 yields of the corresponding thiiranes as identified by elemental and spectral analyses. From a 33.7 percent solution of the bisisothiouronium chloride of GE 1–2 was recovered a 95 percent yield of the bisthiirane.

EXAMPLE 2

Sizing Tests

All tests of the water-soluble isothiouronium slats were made with an unbleached hardwood soda pulp having a Canadian Standard Freeness of about 400 ml. To the pulp slurry was added an appropriate amount of the test additive. Then the pulp pH was adjusted to 8.0–10.0 with dilute NaOH and the retention aid, if any, added. Handsheets were formed from the pulp slurry using the general procedure of TAPPI Standard T 205–28 with the sheets being dried in a hot press at a platen temperature of about 120°C. for 4 minutes.

Comparative tests with the polyphenol thiirane ethers were made using a 1 percent methylene dichloride solution of the thiirane and unbleached and unsized Kraft paper. The test pieces were dipped in the thiirane solution, the excess drained and blotted off, and the pieces dried at 150° C. for 4 minutes.

Sizing tests were made at room temperature using a standard KBB size tester and recording the time in seconds necessary for sufficient water to penetrate the paper to carry a current of 80 microamperes. Typical results are given in table 2. For comparison, Aquapel 360, a commercial ketene dimer size had an average KBB of 146 sec. under these test conditions.

Table 2

| Test | Size from Diglycidyl Ether of A (GE 1–1) Size | Av. KBB |
|---|---|---|
| 2–0 | Control | 0.2 sec. |
| 2–1 | 1% GE 1-1 Bisepoxide | 1 sec. |
| 2–2 | 1% GE 1-1 Bisisothiouronium Cl | 99.9 sec. |
| 2–3 | 1% GE 1-1 Bisthiirane | 66 sec. | note that the isothiouronium salt or thiirane is an essential element for significant sizing.

TABLE 3.—POLYPHENOL ISOTHIOURONIUM SIZE

| Test | Isothiouronium chloride from glycidyl ether | Concentration Size | PEI a | Average KBB size (sec.) |
|---|---|---|---|---|
| 3–0 | Control b | b 0.5 | 0.3 | 0.7 |
|  |  | b 0.75 | 0.4 | 0.8 |
| 3–1 | 1-1; Formula I: $R=R'=CH_3, n=0$ | 0.5 | 0.3 | 78.5 |
|  |  | 1.0 | 0.5 | 93.5 |
| 3–2 | 1-2; Formula I: $R=CH_3, R'=C_{17}H_{35}, n=0$ | 0.5 | 0.3 | 74.5 |
|  |  | 0.5 | 0.5 | 92.1 | a Polyethylenimine retention aid.
b Diglycidyl ether of bisphenol A.

The tests in Table 3 use PEI as a retention aid. Other water-soluble cationic retention aids including cationic polyacrylamide can be used, but best results have been obtained with PEI as a retention aid in a ratio of about 0.2–2.0, and preferably about 0.5–1.0, parts of PEI per part of isothiouronium salt.

TABLE 4.—BISPHENOL AND NOVOLAC THIIRANE ETHERS

| Test | Thiirane from glycidyl ether | Conc. | Average KBB size (sec.) |
|---|---|---|---|
| 4-0 | Untreated control | | 0.2 |
| 4-1 | 1-1; Formula I: R=R'=CH$_3$, n=0 | 0.188 | 25.9 |
|  |  | 0.375 | 76.6 |
| 4-2 | 1-2; Formula I: R=CH$_3$, R'=C$_{17}$H$_{35}$, n=0 | 0.094 | 63.4 |
|  |  | 0.375 | 85.1 |
| 4-3 | 1-6; Formula II: n~1.6, percent | 1 | 70 |
| 4-4 | Aquapel 360,ª percent | 1 | 146 |

ª Commercial size, Hercules, Inc.

Data in table 4 indicates the activity of the thiiranes prepared from the isothiouronium salts and is evidence for the possible formation of these compounds during the isothiouronium sizing process.

EXAMPLE 3

Sizing Process Conditions

Test results from a more detailed sizing process study using the bisisothiouronium chloride of the diglycidyl ether of 2,2'-bis(hydroxyphenyl)propane (GE 1-1) are shown in table 5 using an unbleached hardwood soda pulp. The bisisothiouronium salt was blended with the pulp, the pH adjusted, PEI added as a retention aid, and handsheets made as described in example 2.

TABLE 5

| Test | Sizing with Bisisothiouronium Chloride of the Diglycidyl Ether of 2,2'-Bis(hydroxphenyl)propane | | | | |
|---|---|---|---|---|---|
|  | Conc., wt. % Sizeª | PEI | Cure pH | T° C. | Av. KBB Size, (sec.) |
| 5-0 | Control | | 10 | 150° | 0.3 |
| 5-1 | 0.5% | 0.5% | 10 | 150° | 78.4 |
| 5-2 | 0.5% | 0.5% | 10 | 110° | 77.6 |
| 5-3 | 0.5% | 0.5% | 8 | 150° | 57.5 |
| 5-4 | 0.5% | 0.5% | 7 | 150° | 5.8 |
| 5-5 | 1.0% | 0.5% | 10 | 150° | 99.9 |
| 5-6 | 0.4% | 0.6% | 9 | 150° | 83.6 |

These tests confirm the utility of the isothiouronium sizing process for paper made at an alkaline pH.

We claim:

1. In a process for sizing paper, the improvement which comprises:
   A. adding to an acid or neutral slurry of cellulosic pulp about 0.01–3.0 wt. percent based on dry pulp of a water-soluble isothiouronium salt of a polyglycidyl ether of a polyhydric phenol having a molecular weight less than about 1,200;
   B. Adjusting the slurry pH to about 8–10; and then
   C. Forming and drying the paper sheet.

2. The process of claim 1 where about 0.1–2.0 wt. percent of the isothiouronium salt is added as the sizing agent and the paper sheet is dried at about 100°–150° C.

3. The process of claim 1 where the isothiouronium salt is the bisisothiouronium chloride of a bisphenol-epichlorohydrin glycidyl ether of the formula:

$$CH_2\text{—}CHCH_2\text{—}\left(O\text{—}\bigcirc\text{—}\underset{R'}{\overset{R}{C}}\text{—}\bigcirc\text{—}OCH_2CHCH_2\right)_n\text{—}O$$

$$\text{—}\bigcirc\text{—}\underset{R'}{\overset{R}{C}}\text{—}\bigcirc\text{—}OCH_2\text{—}CH\text{—}CH_2$$

where
R is H or C$_1$–C$_2$ alkyl,
R' is H or C$_1$–C$_{18}$ alkyl, and
n is 0–3.

4. The process of claim 3 where R and R' are —CH$_3$.

5. The process of claim 3 where R is —CH$_3$ and R' is —(CH$_2$)$_{16}$CH$_3$.

6. The process of claim 1 where the isothiouronium salt is the bisisothiouronium chloride of a phenol-formaldehyde novolac glycidyl ether of the formula:

$$CH_2\text{—}CHCH_2\text{—}O\text{—}\bigcirc\text{—}CH_2\left[\bigcirc\text{—}OCH_2CH\text{—}CH_2\ \bigcirc\text{—}OCH_2CH\text{—}CH_2\ \text{—}CH_2\text{—}\right]_n$$

where n is 0–3.

7. The process of claim 6 where the isothiouronium salt has an average of 2 to 3 isothiouronium groups and n is 0–1.

8. The process of claim 1 where after adjusting the pulp slurry pH to about 8–10, about 0.2–2.0 parts of polyethylenimine per part of isothiouronium salt is added to the pulp slurry before the paper sheet is formed.

9. The process of claim 1 where the pulp slurry is treated with about b 0.4–1.0 wt. percent of the bisisothiouronium chloride salt of a diglycidyl ether of bisphenol A, the slurry pH is adjusted to about 8–10, about 0.4–1.0 wt. percent PEI added, and the paper sheet is formed and dried at about 100°–150° C.

10. A cellulosic product sized by the process of claim 9.

* * * * *